US006712994B1

(12) United States Patent
Miller

(10) Patent No.: US 6,712,994 B1
(45) Date of Patent: Mar. 30, 2004

(54) METHOD AND COMPOSITION FOR THE PRESERVATION OF FILM

(76) Inventor: Brad A. Miller, 351 E. Brentford Cir., Littleton, CO (US) 80126

( * ) Notice: Subject to any disclaimer, the term of this patent is extended or adjusted under 35 U.S.C. 154(b) by 280 days.

(21) Appl. No.: 09/721,810

(22) Filed: Nov. 23, 2000

Related U.S. Application Data

(60) Provisional application No. 60/167,488, filed on Nov. 24, 1999.

(51) Int. Cl.[7] ............................ C09K 3/00; G03C 1/76

(52) U.S. Cl. ........................ 252/381; 252/384; 430/523; 430/934; 430/961

(58) Field of Search ................................ 252/380, 381, 252/384; 430/523, 934, 961

(56) References Cited

U.S. PATENT DOCUMENTS

| | | | | | |
|---|---|---|---|---|---|
| 3,972,825 | A | * | 8/1976 | Gottesman et al. | 252/382 |
| 4,039,470 | A | * | 8/1977 | Kalmar | 252/382 |
| 4,962,256 | A | * | 10/1990 | Le et al. | 585/467 |
| 5,105,038 | A | * | 4/1992 | Chen et al. | 585/10 |
| 5,266,455 | A | * | 11/1993 | Jones | 430/536 |
| 5,286,407 | A | * | 2/1994 | Inoue et al. | 252/188.28 |
| 5,344,808 | A | * | 9/1994 | Watanabe et al. | 503/227 |
| 5,443,604 | A | * | 8/1995 | Stowell | 51/307 |
| 5,462,589 | A | * | 10/1995 | Nicholas et al. | 106/18.33 |
| 5,516,954 | A | * | 5/1996 | Chang et al. | 585/467 |
| 5,786,134 | A | * | 7/1998 | Nair et al. | 430/517 |
| 5,928,848 | A | * | 7/1999 | Nair et al. | 430/510 |
| 6,057,039 | A | * | 5/2000 | Takeshita et al. | 428/447 |
| 6,149,970 | A | * | 11/2000 | Frigge et al. | 427/154 |

OTHER PUBLICATIONS

Booser, Handbook of Lubrication Theory and Practice of Tribology vol. II, pp. 53–54 and 260, FLA, CRC Press, Inc., 1984.*

Schey, Tribology in Metalworking “Friction Lubrication and Wear” American Society For Metals, Ohio, pp. 133–136 and 138, 1983.*

* cited by examiner

*Primary Examiner*—Margaret B. Medley
(74) *Attorney, Agent, or Firm*—Akin Gump Strauss Hauer & Feld LLP; Dwayne L. Mason

(57) ABSTRACT

The present invention provides a non-evaporating lubricant and cleaner formulation that protects all types of film by forming a slick protective coating that reduces or eliminates dirt, scratches and static charges. An embodiment of the present invention comprises an organic mixture of greater than ninety-five percent (95%) aliphatic hydrocarbons. A preferred embodiment of the present invention comprises aliphatic petroleum naphtha, aliphatic petroleum distillates and petroleum base oil.

24 Claims, No Drawings

METHOD AND COMPOSITION FOR THE PRESERVATION OF FILM

CROSS REFERENCE TO RELATED APPLICATION

This application is based on provisional patent application Ser. No. 60/167,488 filed Nov. 24, 1999.

FIELD OF THE INVENTION

This invention relates to a formulation that is applied to the surface of film to preserve the film.

BACKGROUND AND GENERAL DESCRIPTION

Ideally, the elimination of dust and dirt from the environment in which a film is used would prevent much of the scratching and dirt particle collection of films. However, even diligent procedures including wearing gloves, mopping the floor, and checking the relative humidity of the booth environment has been shown to be insufficient.

The problem of dust collection on film prints is now even greater since most film prints are made on polyester base stock, which has a strong attraction for airborne dust and dirt and is easily scratched. Therefore, it is almost a necessity that the film be cleaned. Furthermore, the industry's transition to polyester film was accompanied by a loss of ability to lubricate prints at the theater level. Recent attempts to lubricate prints at the lab have been less than effective. The making of film comprises a complex operation, examples of which are found in U.S. Pat. Nos. 6,149,970; 6,057,039; 5,928,848; 5,786,134 and 5,344,808 incorporated herein by reference.

The three basic types of cleaners used in theatres today include the standard dry-web media cleaner, the static-brush design and particle transfer rollers. The static-brush design is only effective under ideal conditions, of which 90% of all theatres do not have. The particle transfer rollers once loaded with dirt tend to transfer the dirt particles from one part of the film to the other, as opposed to removing the dirt from the film's surface. Consequently, the standard dry-web media cleaner is clearly the cleaner of choice.

Liquid film cleaners currently available on the market are evaporative, such as, ECCO, and Renovex (a trademark of Neumade/Xetron). Pads of one type or another are soaked in the liquid and then the film is quickly dragged through the cloth, before the cleaner evaporates.

It is also somewhat common practice to clean the projector with compressed air, Xe-Kote, paintbrushes, and the like, but these are poor methods to clean a projector. While the projector may look clean and shiny after applying a liquid cleaner to it, the clean appearance is primarily due to the light reflecting off of the liquid. The biggest problem with these cleaners, however, is the residue left behind on the projector that will transfer to the print during the show.

Unfortunately, even if a film is just a little bit dirty and not yet scratched, the dirt may have already become part of the emulsion. On the other hand, if the film is still fairly new, a little dirty and the emulsion hasn't hardened yet, running a film cleaner can scratch the film while it is pulling the loose dirt off.

DETAILED DESCRIPTION

The present invention is a pioneer discovery that has resulted in new and unexpected results. The present invention provides a formulation that cleans, lubricates, coats and protects all types of motion picture film. The formulation is a very slow to non-evaporating lubricant and cleaner, having an evaporation rate of at least one (1) day to one year or more. The prior art solutions typically evaporate in seconds. The formulation of the present invention unexpectedly neutralizes static charges, covers up base scratches, cleans up old prints, and keeps new prints looking like new even after hundreds of runs. While most commercially available products cannot be used to lubricate polyester film, the present formulation does not damage polyester film stock. The formulation is even safe for use with magnetic prints. The formulations works by cleaning dust and dirt off of the film and forming a slick protective coating that ensures hundreds of runs free of dirt, scratches and static charges. Even Dolby Digital and SDDS digital audio tracks play flawlessly over time because there is no dirt or scratches to cause them to dropout to analog audio.

The formulation is an organic mixture comprising greater than 95 percent aliphaitac hydrocarbons. The term "Aliphatic hydrocarbons", as used herein, refers to a group of organic compounds (containing only carbon and hydrogen) characterized by straight-chain and/or branched-chain (not cyclic) of the constituent carbon atoms, including the paraffins (alkanes), olefins (alkanes or alkadienes), and acetylenes (alkynes).

It is preferred that the aliphatic hydrocarbon portion of the formulation comprise aliphatic petroleum naphtha, aliphatic petroleum distillates and petroleum base oil. The term "Petroleum Naphtha", as used herein, refers to refined, partly refined, or unrefined, petroleum products not less then 10% of which distil below 347° F. (175° C.) and not less than 95% of which distil below 464° F. (240° C.) when subject to distillation. The term "Aliphatic Petroleum Distillates", as used herein, refers to a distillation-separated mixtured of straight-chain and branched-chain organic compounds obtained from a petroleum distillate. The term "Petroleum Base Oil", as used herein, refers to a complex mixture of paraffinic, cycloparaffinic (naphthenic) and aromatic hydrocarbons.

A large percentage of the preferred formulation comprised alkyl benzenes. The manufacture of alkyl benzenes has been well chronicled as a result of the work of Professor Friedel, a French chemist, in collaboration with Professor Crafts, an American chemist, which yielded the development of Friedel Crafts Alkylation. This is an electrophilic aromatic substitution whereby a carbonation is generated as the electrophilic. There are several ways this can be done as shown in FIG. 1 below.

FIG. 1-Methods of Generating Carbocations For Alkylation (a)

$$R{-}Cl + AlCl_3 \longrightarrow R^+ + AlCl_4^-$$

(b)

$$R{-}CH{=}CH_2 + H^+ \longrightarrow R{-}\underset{+}{CH}{-}CH_3$$

(c)

$$R{-}CH{=}CH_2 + BF_3 \longrightarrow R{-}\underset{+}{CH}{-}CH_2{-}\overset{-}{B}F_3$$

Where R = any hyrocarbon alkyl group

Once the carbocation has been generated then the reaction proceeds to the alkylated Benzene Ring (FIG. 2)

FIG. 2-Net Reaction For Friedel-Crafts Alkylation

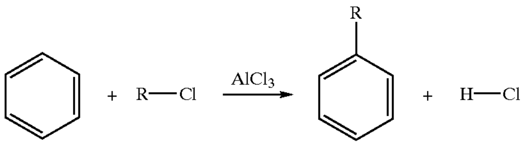

The reaction mechanism for this alkylation is shown in FIG. 3 below.

FIG. 3-Reaction Mechanism for Friedel-Crafts Alkylation

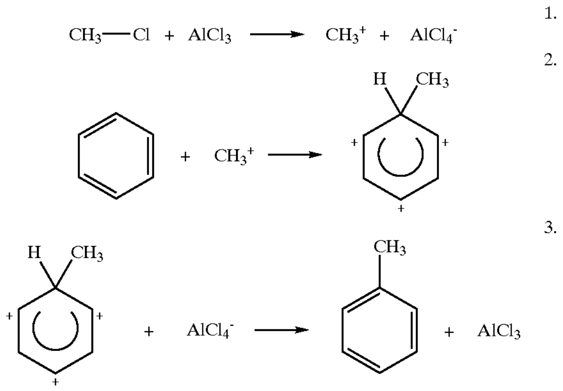

There are a number of problems dealing with the alkylation reaction that lead to the development of a similar reaction, Friedel-Crafts Acylation. The limitations to this alkylation reaction include:

1. Polysubstitution- since the alkyl group that has been placed on the Benzene ring activates the ring toward further substitution, and each subsequent alkylation increases this activation of the ring, this leads to alkylation of the ring in several positions. This is called "polysubstitution" and leads to extremely low yields of the monosubstituted product.
2. Possible rearrangement of the initial carbonation- Carbocations will undergo molecular rearrangement where a Hydrogen will move over to an adjacent carbon with the bonding electrons (hydride shift) or a methyl group will move over to the adjacent carbon with the bonding electrons(methide shift). This molecular rearrangement within a carbonation will only occur if it results in a more stable carbonation. We know that the relative stability of carbocations runs:

$C_6H_5—CH_2^+=CH_3—CH=CH_2^{30}$
$>$tertiary$>$secondary$>$primary$>CH_3^+$

So if a hydride or methide shift results in a primary carbonation becoming a tertiary or secondary carbonation then the molecular rearrangement will occur at least partially resulting in possible multiple products for alkylation. Molecular rearrangement will not occur if it would result in a tertiary carbonation becoming a secondary or primary carbonation.

3. Benzene derivatives where the substituents deactivate the ring give very poor yields in all Friedel-Crafts reactions. 4. Halobenzenes or vinylic halides cannot be used as the alkylating agent because they do not form carbocations readily. This is true for both Friedel-Crafts reactions More recent developments have yielded the Linear alkyl benzene (LAB), which may also be employed according to the present invention. Suitable technology for the manufacture of LAB has been developed by Universal Oil Products (UOP) Inc. The key raw materials are Kerosene and Benzene. The manufacturing process usually employs two manufacturing units, i.e., a Normal Paraffin Production Unit (NPU) and LAB Production Unit (LPU). The NPU primarily consists of a Prefractionation section, a Hydrotreater section and a Molex section. The Molex technology is also a proprietary technology of UOP. It consists of proprietary Molecular Sieves supplied by UOP and a Rotary Valve, which is also of a unique design. The LPU consists of a Pacol section, a Define section and a Detergent Alkylate section. The Pacol section utilizes proprietary Platinum-based Catalyst for dehydrogenation of Paraffins to Olefins. The Define technology converts the Di-olefins formed as a side reaction in the Pacol section, to Mono-olefins thereby improving the yield of LAB. A typical specification for linear alkyl benzene is as follows:

Specifications for LAB

Product: Superlab 240

| S. No. | Characteristics | Test Method | Code: SL 402 Specification |
|---|---|---|---|
| 1. | MOLECULAR WEIGHT | UOP 673 | 241 ± 2 |
| 2. | SPECIFIC GRAVITY | ASTM D-1298 | 0.855–0.870 |
| 3. | BROMINE INDEX | UOP 304 | 20 Max |
| 4. | SAYBOLT COLOUR | ASTM D-156 | +30 Min. |
| 5. | PARAFFIN CONTENT (WT %) | UOP 673 | 0.5 Max |
| 6. | HOMOLOG DISTRIBUTION.(WT %) | UOP 673 | |
| | <C10 | " | 1.0 Max |
| | C10 | " | 16 Max |
| | C10 + C11 | " | 35–55 |
| | C13 + C14 | " | 5–27 |
| | C14 | " | 3.0 Max |
| | >C14 | " | 0.5 Max |
| 7. | COMPLETION OF SULPHONATION | UOP 429 | 97.5% Min |
| 8. | ISOMER DISTRIBUTION: 2-PHENYL ISOMER | UOP 673 | 10%–25% |
| 9. | DI-ALKYL TETRALIN(98% Conc. Acid) | ECOSOL | 1.0% Max |
| 10. | ACID WASH TEST (98% CONC. ACID) | EM 07203 | 15% Min |
| 11. | MOISTURE | UOP 481 | 0.1% Max |
| 12. | BIODEGRADABILITY OF SODIUM ALKYL BENZENE SULPHONATE | ASTM D-2667 | 90% Min |

Tamilnadu Petroproducts Limited. Furthermore, suitable alkyl benzenes as described in U.S. Pat. Nos. 5,516,954 and 4,962,256, incorporated herein by reference, may be used in accordance with the present invention.

The present invention also employs aliphatic hydrocarbons. Aliphatic hydrocarbons are any chemical compound belonging to the organic class in which the atoms are not linked together to form a ring. One of the major structural groups of organic molecules, the aliphatic compounds include the alkanes, alkenes, and alkynes, and substances derived from them—actually or in principle—by replacing one or more hydrogen atoms by atoms of other elements or groups of atoms. Suitable aliphatic hydrocarbons may be employed according to the teachings of U.S. Pat. No. 5,105,038, incorporated herein by reference.

Accordingly, one preferred formulation comprises between 13 and 23 weight percent aliphatic petroleum naphtha, between 17 and 25 percent aliphatic petroleum distillates, between 5 and 10 percent petroleum base oil, and the balance aliphatic hydrocarbons. While the formulation may comprise only hydrocarbons, the formulation may include one or more additives including, but not limited to, stabilizers, viscosity enhancers, fire retardants and water repellants all of which are well known to those skilled in the art.

Because the formulation primarily includes broad classes of aliphatic hydrocarbons, the exact composition of which are not readily determinable, it may be useful to characterize the mixture by its physical and chemical characteristics. Specifically, a formulation prepared according to the composition noted below in Example 1 was characterized in having a boiling point of 402° F., specific gravity of 0.735 (water=1), vapor pressure of 100 torr at 164° F., vapor density less than one (air=1), evaporation rate less than one (butyl acetate=1), was insoluble in water, and formed a clear, light brown colored liquid.

Although the formulation can be applied just like any other film cleaning solution on the market, the preferred method is to apply the formulation with a typical dry web media cleaner, essentially converting it into a wet cleaner that will polish a protective coating on the film to keep the print free from dirt and scratches regardless of the number of runs. Since these small machines are film driven and geared to a take-up shaft, a constant fresh stretch of media is presented to the film at all times during the show. In addition, these machines will apply even pressure unlike a pair of hands attempting to hold a cloth on the rewind bench. Best of all, it is fully automated and once set requires no operator attention whatsoever.

Since the formulation does not evaporate, a thin coating is created on both sides of the film. Thus, the film may be said to be "submerged" in liquid and will project to the screen with true "wet gate" qualities, the likes of which can only be seen today in laserdiscs, digital video discs and the new DLP video projection system. Existing scratches are not removed, but rather are covered up and will not project to the screen even though they are still there. The present invention provides these benefits to a consumer without the need to purchase new equipment or make any modifications to existing equipment. By contrast, liquid cleaners that evaporate from the film surface are inherently unable to function as a lubricant.

While the formulation is effectively used on films in many conditions, it is preferred to use the formulation on the first screening, because once dirt is visible it is often already embedded into the emulsion layer of the print and the majority of it is then permanent. More preferably, the formulation is used during each running of the film or at least two or three times a week per print, depending on the particular booth environment.

The method includes loading up two rolls (one for the base side and one for the emulsion) onto the media cleaner as normal. Then, the pads are soaked with the formulation, preferably by delivering the formulation from a spray bottle held with the sprayer tip against the media pads. The film can then be run through the cleaner as normal. At the end of each show, the media pads should be rewound for another show. It is preferred that the cleaner and formulation be run on every showing of the film and that the new pads with freshly soaked formulation be loaded onto the cleaner once a week. An alternative method for theatres that don't have enough of these film cleaning machines for every film projector is to cycle the cleaners between the auditoriums during the course of the week. In short, the more prints are run through the formulation, the better they will look. And since the pads and film are wet, using the formulation every show will prevent the action of the film rubbing across the pads from creating a static charge on even polyester prints.

After the first application of the formulation to a print, some light streaking which looks like water on the film is ordinarily noticeable. This appearance is a part of the normal coating process and will disappear within the first one or two showings. For this reason, it is suggested to apply the formulation starting on the first run-through showing. In this manner, the first showing to the public will be a perfectly clean presentation.

While the formulation is not intended for use with Photoguarded prints, the formulation will not damage them. The formulation does not benefit Photoguarded prints because the formulation cannot penetrate through the Photoguard. However, Photoguarded prints are a rarity and most theatres will never run one.

Typically a one quart spray bottle of the formulation will last for one month for the average 8 screen theatre. That estimate will vary slightly due to climates and other conditions specific to the theatre. For example, if a facility runs 6 shows a day, the pads may require changing once every 5 days. On the other hand, if the facility runs 3 shows a day, the pads would be changed out every 10 days. Since conditions will vary, the pads should be changed out when they are severely drying out. On the other hand, if the pads are still moist after 7 days of running, they can effectively be used a couple of extra days.

When using the formulation, projectors do not need to be cleaned between shows. Rather, brushing out the projector once a week is more than acceptable. The only real reason to clean the projectors is to remove a small buildup of the formulation that may accumulate on the sound drum. A quick wipe with a degreaser will remove this buildup quickly and easily. Since shedding is put to a halt, the projector simply doesn't get dirty. The time spent in rewinding the cleaning pads between shows (approximately 20 seconds) is more than made up for in the time saved by not needing to clean the projector heads between shows.

EXAMPLE 1

A formulation was prepared to yield the following composition as measured by GC/MS analysis, E.P.A. 8270M, Direct Injection Method:

| COMPOUND | CONCENTRATION (Vol. %) |
|---|---|
| Ethanol, 2-butoxy- | 2.75 |
| Benzene, 1,2,3-trimethyl and its isomers | 2.93 |
| Benzene, 1-methyl-3-propyl- | 3.45 |
| Benzaldehyde, propylhydrazone- | 5.39 |
| Cyclotaterene, phenyl- | 1.62 |
| Benzene, 1-methyl-2-(1-methylethyl)- and its isomers. | 6.10 |
| Benzene, 1,2,3,4-tetramethyl- and its isomers | 7.75 |
| Benzene, 1-methyl-2-(2-propenyl)- | 6.28 |
| Benzene, 1-ethyl-2,3-dimethyl- and its isomers | 3.54 |
| Benzene, 1-ethyl-2,4,5-trimethyl- and its isomers | 4.42 |
| Napthalene, 2-butyl- and its isomers | 3.58 |
| 1H-Indene, 1-ethylidene- and its isomers | 4.63 |
| Napthalene, 2-6-dimethyl- and its isomers | 5.77 |
| Napthlalene, 2-methyl- and its isomers | 3.25 |

-continued

| COMPOUND | CONCENTRATION (Vol. %) |
|---|---|
| Napthalene, 2,3,6-trimethyl- and its isomers | 4.93 |
| Normal Petroleum Hydrocarbons (C10–C30) | 30.69 |
| Total: | 100 |

The resulting mixture had a boiling point of 402° F., specific gravity of 0.735 (water=1), vapor pressure of 100 torr at 73.5° C., vapor density less than one (air=1), evaporation rate less than one (butyl acetate=1), was insoluble in water, and formed a clear, light brown colored liquid.

Two rolls (one for the base side and one for the emulsion) were loaded up onto the media cleaner as normal. Then, the pads were soaked with the formulation. A film was then run through the cleaner as normal. At the end of the first and each subsequent show, the media pads were rewound prior to the next show. New pads with freshly soaked formulation were loaded onto the cleaner once a week.

EXAMPLE 2

A print that had been treated in accordance with a formulation having the composition of Example 1, was accidentally exposed to a considerable amount of water coming from a leaking roof. When the film was used following the water exposure, the film still ran perfectly fine and projected flawlessly. By contrast, other untreated prints exposed to similar amounts of water from the same leak were stuck together and very tacky, with the emulsion literally peeling off.

EXAMPLE 3

By placing film moving clamps on the untreated print of Example 2 and standing it upright, thick paper towels soaked with a formulation having the composition of Example 1 were wiped on both sides of the film, literally to the point where the edges of the print were shining with the formulation. After letting the formulation soak in for a few minutes, the film could be threaded up as normal and was run through a freshly soaked set of new media pads. Only the tail end of the film, which was attempted to be unraveled before applying the formulation, wouldn't project. The rest of the print looked fine.

EXAMPLE 4

While the stated average useful life of a print is about 300 runs, a single print film was run for eight (8) months and three (3) weeks at a rate of six shows a day for a total of over 1500 runs. The film was treated during each run using a dry media applicator and the formulation in accordance with Example 1. After the last run, the appearance of the print was in better condition, i.e., no scratches and not a sign of any dirt, than when the print was brand new.

While the emulsion on a print becomes harder the more it is run, typical operation without the present formulation allows dirt to become permanently embedded into the film emulsion before it can sufficiently harden. Using the present formulation before dirt becomes embedded allows the print to be run long enough for the emulsion to harden without dirt accumulating therein. The hardened emulsion is more durable, harder to scratch, and provides noticeable improvements in the image on screen.

EXAMPLE 5

Several prints having a distinct vinegar odor were coated with the formulation of Example 1 and run without problems and without the vinegar smell.

EXAMPLE 6

Two different films were stored for an extended period. One film was stored wet with the formulation of Example 1 and the other film was stored dry. After an extended period of time, the film stored dry became brittle, warped and will not run steadily, yet the film stored wet with the formulation ran perfectly.

EXAMPLE 7

35 mm and 70 mm magnetic films were protected with the formulation in accordance with the procedure described in Example 1. Even after repeated running of the films, examination of the films showed no degradation and the tracks held up so well that dropouts never occurred.

While the foregoing is directed to the preferred embodiment of the present invention, other and further embodiments of the invention may be devised without departing from the basic scope thereof. For example, it is within the scope of the present invention that all film, natural and man made materials know to those skilled in the art and which may be developed in the future may be preserved and protected as described herein, including but not limited to film packaging; microfilm; computer, audio and video media (e.g. floppy disks, CD-ROMS, DVDs, phonographic records, cassette tape, recording tape); plastics, rubber, leather, patent leather, etc and the term "film" as used in the appended claims shall have such meaning. Therefore, the scope of the present invention is determined by the claims which follow.

What is claimed is:

1. A formulation for the preservation of a film comprising an organic mixture comprising:

(a) alkyl benzenes; and (b) normal petroleum hydrocarbons.

2. The formulation of claim 1, characterized by a boiling point between 390° F. and 410° F., a specific gravity between 0.7 and 0.75, and insolubility in water.

3. The formulation of claim 1, characterized by a boiling point of about 402° F., specific gravity of about 0.735 ($H_2O$=1), and water insolubility.

4. The formulation of claim 3, further characterized by a vapor pressure of 100 torr at 164° F., vapor density less than one, and an evaporation rate less than one.

5. The formulation of claim 1, wherein said hydrocarbons comprises:

(a) between 13 and 23 weight percent aliphatic petroleum naphtha;

(b) between 17 and 25 percent aliphatic petroleum distillates; and (c) between 5 and 10 percent petroleum base oil.

6. The formulation of claim 5, characterized by a boiling point between 390° F. and 410° F., a specific gravity between 0.7 and 0.75, and water insolubiltity.

7. The formulation of claim 5, characterized by a boiling point of about 402° F., specific gravity of about 0.735 ($H_2O$=1), and water insolubility.

8. The formulation of claim 7, further characterized by a vapor pressure of 100 torr at 164° F., vapor density less than one, and an evaporation rate less than one.

9. A formulation for the preservation of a motion picture film, said formulation comprising a mixture of alkyl benzenes and normal petroleum hydrocarbons characterized by a evaporation rate in the range of one day to one year.

10. The formulation of claim 9, wherein said hydrocarbons comprise aliphatic petroleum naphtha, aliphatic petroleum distillates and petroleum base oil.

11. The formulation of claim 10, wherein said mixture is characterized by a boiling point between 390° F. and 410° F., a specific gravity between 0.7 and 0.75, and insolubility in water.

12. The formulation of claim 10, wherein said mixture is characterized by a boiling point of about 402° F., specific gravity of about 0.736 ($H_2O=1$), and water insolubility.

13. The formulation of claim 12, further characterized by a vapor pressure of 100 torr at 164° F., vapor density less than one, and an evaporation rate less than one.

14. A method for the preservation of a film comprising:

(a) providing a mixture of alkyl benzenes and normal petroleum hydrocarbons; and (b) coating said film with said mixture.

15. The method of claim 14, wherein said mixture is characterized by a boiling point between 390° F. and 410° F., a specific gravity between 0.7 and 0.75, and insolubility in water.

16. The method of claim 14, wherein said mixture is characterized by a boiling point of about 402° F., specific gravity of about 0.735 ($H_2O=1$), and water insolubility.

17. The method of claim 16, wherein said organic mixture is further characterized by a vapor pressure of 100 torr at 164° F., vapor density less than one, and an evaporation less than one.

18. The method of claim 14, wherein said hydrocarbons comprise:

(a) between 13 and 23 weight percent aliphatic petroleum naphtha;

(b) between 17 and 25 percent aliphatic petroleum distillates; and (c) between 5 and 10 percent petroleum base oil.

19. A print film having an average useful life of a print between 300 and 1,500 runs comprising an aqueous organic mixture comprising alkyl benzenes and normal petroleum hydrocarbons on a side of said film, wherein the hydrocarbons comprise:

(a) aliphatic petroleum naphtha;

(b) aliphatic petroleum distillates; and (c) petroleum base oil.

20. The print film of claim 19, wherein the organic mixture is characterized by a boiling point between 390° F. and 410° F., specific gravity between 0.7 and 0.75, and insolubility in water.

21. The print film of claim 19, wherein the organic mixture is characterized by a boiling point of about 402° F., specific gravity of about 0.735 ($H_2O=1$), and water insolubility.

22. The print film of claim 21 wherein said organic mixture is further characterized by a vapor pressure of 100 torr at 164° F., vapor density less than one, and an evaporation rate less than one.

23. The print film of claim 19, wherein said hydrocarbons comprise:

(a) between 13 and 23 weight percent aliphatic petroleum naphtha;

(b) between 17 and 25 percent aliphatic petroleum distillates; and (c) between 5 and 10 petroleum base oil.

24. The formulation of claim 10, wherein said hydrocarbons comprises:

(a) between 13 and 23 weight percent aliphatic petroleum naphtha;

(b) between 17 and 25 percent aliphatic petroleum distillates; and (c) between 5 and 10 petroleum base oil.

* * * * *

UNITED STATES PATENT AND TRADEMARK OFFICE

CERTIFICATE OF CORRECTION

PATENT NO. : 6,712,994 B1
DATED : March 30, 2004
INVENTOR(S) : Brad A. Miller

It is certified that error appears in the above-identified patent and that said Letters Patent is hereby corrected as shown below:

Column 9,
Line 12, replace "0.736" with -- 0.735 --

Signed and Sealed this

First Day of March, 2005

JON W. DUDAS
*Director of the United States Patent and Trademark Office*